US010330792B2

(12) United States Patent
Niesen et al.

(10) Patent No.: US 10,330,792 B2
(45) Date of Patent: Jun. 25, 2019

(54) REPAIR OF CARRIER-PHASE CYCLE SLIPS USING DISPLACEMENT DATA

(71) Applicant: QUALCOMM Incorporated, San Diego, CA (US)

(72) Inventors: Urs Niesen, Summit, NJ (US); Lionel Jacques Garin, Palo Alto, CA (US); Jubin Jose, Belle Mead, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 313 days.

(21) Appl. No.: 15/265,685

(22) Filed: Sep. 14, 2016

(65) Prior Publication Data

US 2018/0074206 A1    Mar. 15, 2018

(51) Int. Cl.
*G01S 19/22*    (2010.01)
*G01S 19/29*    (2010.01)
(Continued)

(52) U.S. Cl.
CPC ............... *G01S 19/22* (2013.01); *G01S 19/26* (2013.01); *G01S 19/29* (2013.01); *G01S 19/44* (2013.01)

(58) Field of Classification Search
CPC .......... G01S 19/22; G01S 19/29; G01S 19/26; G01S 19/44
See application file for complete search history.

(56) References Cited

U.S. PATENT DOCUMENTS 5,847,680 A * 12/1998 McBurney ............... G01S 19/44
342/357.27

6,236,355 B1 * 5/2001 Farmer ................... G01S 19/44
342/357.27
(Continued)

FOREIGN PATENT DOCUMENTS

| CN | 102763003 A | 10/2012 |
|---|---|---|
| CN | 103454664 A | 12/2013 |

OTHER PUBLICATIONS

Wang B., et al., "An Integer Ambiguity Resolution Method for the Global Positioning System (GPS)-Based Land Vehicle Attitude Determination," Measurement Science and Technology, IOP Publishing, 2009, vol. 20 (7), pp. 1-9.
(Continued)

*Primary Examiner* — Bernarr E Gregory
(74) *Attorney, Agent, or Firm* — Muncy, Geissler, Olds & Lowe, P.C.

(57) ABSTRACT

The disclosure generally relates to position sensors, and more particularly to repair of carrier-phase cycle slips using displacement data. An apparatus for use in position sensing may include a displacement sensor, a positioning signal receiver, a memory, and a processor coupled to the displacement sensor, the positioning signal receiver, and the memory. The processor and memory may be configured to processor and memory are configured to detect a loss of lock of a first carrier tracking loop associated with the first set of carrier-phase measurements, wherein the first carrier tracking loop is associated with a first integer ambiguity, estimate, based on the displacement data, an ambiguity increment to the first integer ambiguity subsequent to the detected loss of lock, and resolve a second integer ambiguity associated with the second set of positioning signals based on the first integer ambiguity and the estimated ambiguity increment.

30 Claims, 9 Drawing Sheets

(51) Int. Cl.
  *G01S 19/26* (2010.01)
  *G01S 19/44* (2010.01)
  *G01S 19/00* (2010.01)

(56) References Cited

U.S. PATENT DOCUMENTS

| | | | |
|---|---|---|---|
| 6,753,810 B1 * | 6/2004 | Yang | G01S 19/44 |
| | | | 342/357.27 |
| 8,164,514 B1 | 4/2012 | Yang et al. | |
| 9,182,497 B2 * | 11/2015 | Geier | G01S 19/44 |
| 2003/0058927 A1 * | 3/2003 | Douglas | G01S 19/26 |
| | | | 375/147 |
| 2003/0149528 A1 | 8/2003 | Lin | |
| 2005/0012660 A1 | 1/2005 | Nielsen et al. | |
| 2005/0101248 A1 * | 5/2005 | Vollath | G01S 19/44 |
| | | | 342/357.27 |

OTHER PUBLICATIONS

Yi Y., "On Improving the Accuracy and Reliability of GPS/INS-Based Direct Sensor Georeferencing," Report No. 484, Geodetic Science and Surveying, The Ohio State University, Dec. 2007, 208 pages.
Altmayer C., "Enhancing the Integrity of Integrated Gps/Ins Systems by Cycle Slip Detection and Correction", Proceedings of the IEEE Intelligent Vehicles Symposium, Dearborn, MI, USA, Piscataway, NJ, USA, IEEE, Oct. 3, 2000, pp. 174-179, XP010528932, DOI: 10.1109/IVS.2000.898337, ISBN: 978-0-7803-6363-2.
International Search Report and Written Opinion—PCT/US2017/049851—ISA/EPO—dated Dec. 12, 2017.
Wang B., et al., "A Fast Integer Ambiguity Repair Method for the Land Vehicle Attitude Determination Using GPS", 11th International IEEE Conference on Intelligent Transportation Systems, Piscataway, NJ, USA, Oct. 12, 2008, pp. 717-722, XP031383447, ISBN: 978-1-4244-21114.

* cited by examiner

REPAIR OF CARRIER-PHASE CYCLE SLIPS USING DISPLACEMENT DATA

FIELD OF DISCLOSURE

Various embodiments described herein generally relate to position sensors, and more particularly to repair of carrier-phase cycle slips using displacement data.

BACKGROUND

Communications networks offer increasingly sophisticated capabilities associated with the motion and/or position location sensing of a mobile device. New software applications, such as, for example, those related to personal productivity, collaborative communications, social networking, and/or data acquisition, may utilize motion and/or position sensors to provide new features and services to consumers. Moreover, some regulatory requirements of various jurisdictions may require a network operator to report the location of a mobile device when the mobile device places a call to an emergency service, such as a "911" call in the United States.

Such motion and/or position determination capabilities have conventionally been provided using Satellite Positioning Systems (SPS). SPS wireless technologies which may include, for example, the Global Positioning System (GPS) and/or a Global Navigation Satellite System (GNSS). A mobile device supporting SPS may obtain positioning signals as wireless transmissions received from one or more satellites equipped with transmitting devices. The positioning signal may be used by the mobile device to estimate geographic position and heading. Some mobile devices may additionally or alternatively obtain positioning signals as wireless transmissions received from terrestrial based transmitters to estimate geographic position and heading and/or include one or more inertial sensors (e.g., accelerometers, gyroscopes, compasses, etc.) to measure an inertial state of the mobile device. Inertial measurements obtained from these inertial sensors may be used in combination with SPS signals to provide estimates of geographic position and heading.

However, conventional methods for combining inertial measurements and SPS signals have thus far been insufficient to effectively reduce error or location uncertainty. Accordingly, new techniques are needed for improving the speed and accuracy of position sensing.

SUMMARY

The following summary is an overview provided solely to aid in the description of various aspects of the disclosure and is provided solely for illustration of the aspects and not limitation thereof.

In one example, an apparatus for use in position sensing is disclosed. The apparatus may include, for example, a displacement sensor configured to generate spatial-based displacement data, a positioning signal receiver configured to: receive a first set of positioning signals from a transmitting device and estimate first range measurements to the transmitting device based on the first set of positioning signals, the first range measurements including a first set of carrier-phase measurements, receive a second set of positioning signals from the transmitting device and estimate second range measurements to the transmitting device based on the second set of positioning signals, the second range measurements including a second set of carrier-phase measurements, memory, and a processor coupled to the displacement sensor, the positioning signal receiver, and the memory, wherein processor and memory are configured to: detect a loss of lock of a first carrier tracking loop associated with the first set of carrier-phase measurements, wherein the first carrier tracking loop is associated with a first integer ambiguity, estimate, based on the displacement data, an ambiguity increment to the first integer ambiguity subsequent to the detected loss of lock, and resolve a second integer ambiguity associated with the second set of positioning signals based on the first integer ambiguity and the estimated ambiguity increment.

In another example, a method for use in position sensing is disclosed. The method may include, for example, generating spatial-based displacement data, receiving a first set of positioning signals from a transmitting device and estimate first range measurements to the transmitting device based on the first set of positioning signals, the first range measurements including a first set of carrier-phase measurements, receiving a second set of positioning signals from the transmitting device and estimate second range measurements to the transmitting device based on the second set of positioning signals, the second range measurements including a second set of carrier-phase measurements, detecting a loss of lock of a first carrier tracking loop associated with the first set of carrier-phase measurements, wherein the first carrier tracking loop is associated with a first integer ambiguity, estimating, based on the spatial-based displacement data, an ambiguity increment to the first integer ambiguity subsequent to the detected loss of lock, resolving a second integer ambiguity associated with the second set of positioning signals based on the first integer ambiguity and the estimated ambiguity increment.

In another example, another apparatus for use in position sensing is disclosed. The apparatus may include, for example, means for generating spatial-based displacement data, means for receiving a first set of positioning signals from a transmitting device and estimate first range measurements to the transmitting device based on the first set of positioning signals, the first range measurements including a first set of carrier-phase measurements, means for receiving a second set of positioning signals from the transmitting device and estimate second range measurements to the transmitting device based on the second set of positioning signals, the second range measurements including a second set of carrier-phase measurements, means for detecting a loss of lock of a first carrier tracking loop associated with the first set of carrier-phase measurements, wherein the first carrier tracking loop is associated with a first integer ambiguity, means for estimating, based on the spatial-based displacement data, an ambiguity increment to the first integer ambiguity subsequent to the detected loss of lock, means for resolving a second integer ambiguity associated with the second set of positioning signals based on the first integer ambiguity and the estimated ambiguity increment.

In another example, a non-transitory computer-readable medium including code, which, when executed by a processor, causes the processor to perform operations is disclosed. The computer-readable medium may include, for example, code for generating spatial-based displacement data, code for receiving a first set of positioning signals from a transmitting device and estimate first range measurements to the transmitting device based on the first set of positioning signals, the first range measurements including a first set of carrier-phase measurements, code for receiving a second set of positioning signals from the transmitting device and estimate second range measurements to the transmitting device based on the second set of positioning signals, the second range measurements including a second set of carrier-phase measurements, code for detecting a loss of lock of a first carrier tracking loop associated with the first set of carrier-phase measurements, wherein the first carrier tracking loop is associated with a first integer ambiguity, code for estimating, based on the spatial-based displacement data, an ambiguity increment to the first integer ambiguity subsequent to the detected loss of lock, code for resolving a second integer ambiguity associated with the second set of positioning signals based on the first integer ambiguity and the estimated ambiguity increment.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration". Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

The terminology used herein is for the purpose of describing particular embodiments only and not to limit any embodiments disclosed herein. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof. Similarly, the phrase "based on" as used herein does not necessarily preclude influence of other factors and should be interpreted in all cases as "based at least in part on" rather than, for example, "based solely on" or "based only on".

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
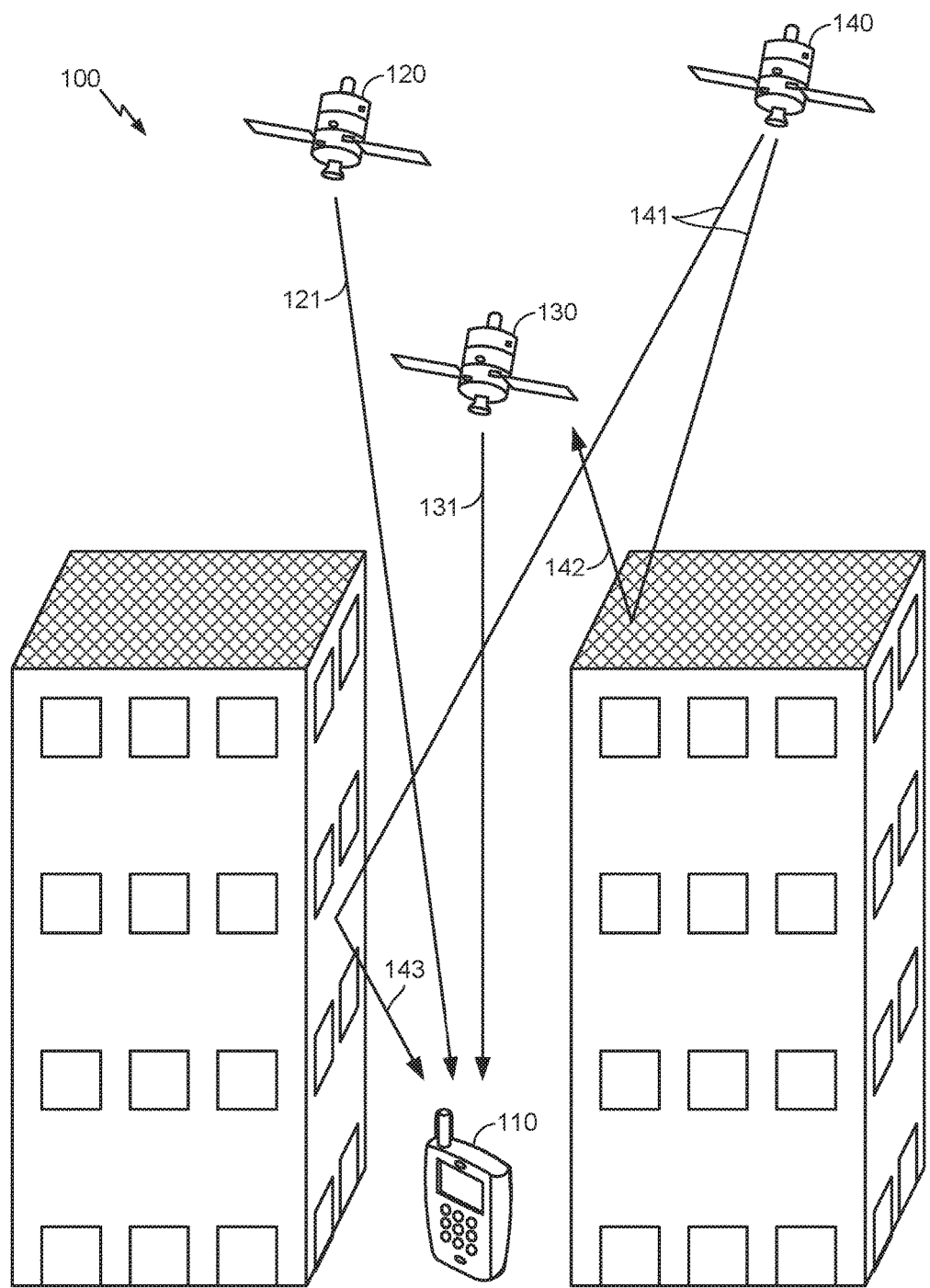
FIG. 1 generally illustrates a position sensing environment in accordance with aspects of the disclosure.

FIG. 1 generally illustrates a position sensing environment 100 in accordance with aspects of the disclosure. The position sensing environment 100 may include a mobile device 110. The mobile device 110 may be configured to determine a position of the mobile device 110 based on positioning signals received within the position sensing environment 100. Although the mobile device 110 is depicted as a mobile telephone, it will be understood that the mobile device 110 may be a music player, a video player, an entertainment unit, a navigation device, a communications device, a mobile device, a mobile phone, a smartphone, a personal digital assistant, a fixed location terminal, a tablet computer, a computer, a wearable device, an Internet of things (IoT) device, a laptop computer, a server, a device in a automotive vehicle, and/or any other device with a need for position sensing capability.

As depicted in FIG. 1, the position sensing environment 100 includes a plurality of transmitting devices 120, 130, 140. The transmitting device 120 may transmit a positioning signal 121, the transmitting device 130 may transmit a positioning signal 131, and the transmitting device 140 may transmit a positioning signal 141. In the position sensing environment 100 depicted in FIG. 1, each of the transmitting devices 120, 130, 140 may be associated with a particular satellite vehicle, and the plurality of satellite vehicles may be part of a satellite positioning system (SPS). However, it will be understood that the mobile device 110 may be configured to receive positioning signals analogous to the positioning signals 121, 131, 141 from any suitable signal source.

In a SPS, a system of transmitting devices (depicted as transmitting devices 120, 130, 140) enable devices such as the mobile device 110 to sense a position on or above the earth based on signals received from transmitting devices analogous to the transmitting devices 120, 130, 140. The transmitting devices 120, 130, 140 may transmit a signal that includes a code, for example, a repeating pseudo-random noise (PRN) code. The transmitting devices 120, 130, 140 may be located on ground-based control stations, user equipment and/or space vehicles. In some implementations, the transmitting devices 120, 130, 140 may be located on Earth-orbiting satellite vehicles (SVs). For example, a SV in a constellation of a Global Navigation Satellite System (GNSS) such as Global Positioning System (GPS), Galileo, Glonass or Compass may transmit a signal marked with a particular code that is distinguishable from codes transmitted by other SVs in the constellation (e.g., using different codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other positioning signals associated with such one or more SPS.

The position sensing environment 100 depicted in FIG. 1 shows an example of a particular scenario in which conventional methods for determining position based on positioning signals (for example, positioning signals associated with an SPS) have thus far been insufficient to satisfactorily reduce error or location uncertainty. Consider, for example, a scenario in which the mobile device 110 must receive each of the plurality of positioning signals 121, 131, 141 in order to quickly and accurately determine the position of the mobile device 110. In the scenario depicted in FIG. 1, which may be referred to as an "urban canyon" scenario, tall structures block one or more of the positioning signals 121, 131, 141 necessary to quickly and accurately determine the position of the mobile device 110. For example, the positioning signal 121 may facilitate position sensing because there is a direct line of sight between the mobile device 110 and the transmitting device 120. Likewise, the positioning signal 131 may facilitate position sensing because there is a direct line of sight between the mobile device 110 and the transmitting device 130. However, because there are intervening structures, the positioning signal 141 may not facilitate position sensing by the mobile device 110.

FIG. 1 depicts two intervening structures, both of which are depicted as tall buildings. However, it will be understood that any intervening structure, natural or man-made, may affect transmission of the positioning signals 121, 131, 141. In this scenario, the positioning signal 141 is blocked by one or more intervening structures, resulting in a blocked positioning signal 142. Because the positioning signal 141 never reaches the mobile device 110, it may not facilitate position sensing. In some scenarios, the mobile device 110 may have previously acquired and tracked the positioning signal 141, and relied on it to sense position. Because the positioning signal 141 is now blocked, the positioning signal 141 is lost. The mobile device 110 may need to replace or re-acquire the positioning signal 141 before the position of the mobile device 110 can be accurately sensed.

Additionally or alternatively, the positioning signal 141 may be reflected off the one or more intervening structures, resulting in a reflected positioning signal 143. Because the positioning signal 141 reaches the mobile device 110 indirectly, it may not facilitate position sensing. As will be discussed in greater detail below, the mobile device 110 may sense position based on estimated times of flight (TOF) associated with the positioning signals 121, 131, 141. Because the positioning signal 141 is reflected and received as the reflected positioning signal 143, the path of the positioning signal 141 is lengthened. Accordingly, the TOF estimated by the mobile device 110 may also be lengthened. As a result, the reflected positioning signal 143 received by the mobile device 110 may cause an inaccurate estimation of the distance between the transmitting device 140 and the mobile device 110. The position sensing capability of the 110 may therefore be degraded.

It will be understood that in some scenarios, for example, urban canyon scenarios, a direct line of sight to the transmitting devices 120, 130, 140 may not be reliably obtained. Accordingly, new techniques are required for position determination.

Figure 2:
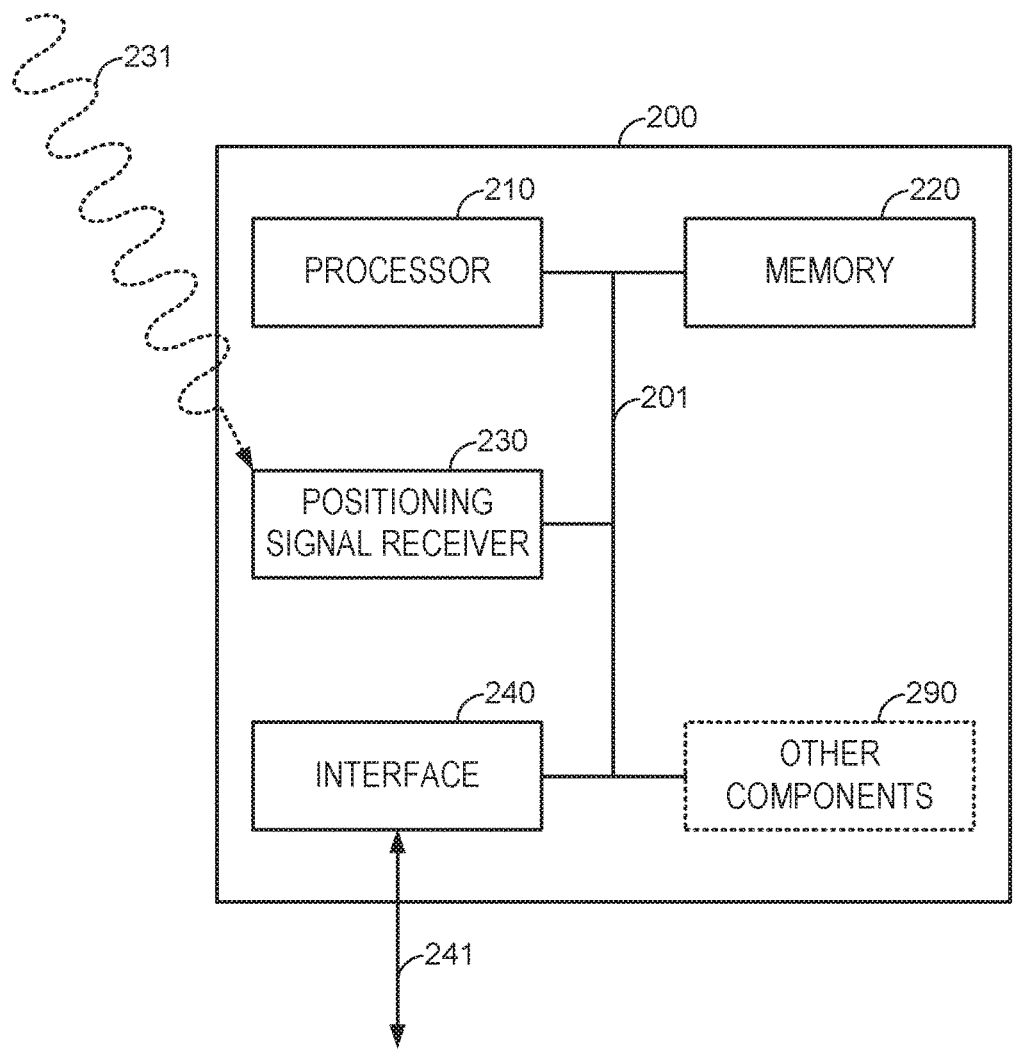
FIG. 2 generally illustrates a mobile device having conventional position sensing capabilities.

FIG. 2 generally illustrates a mobile device 200 having conventional position sensing capabilities.

The mobile device 200 depicted in FIG. 2 includes a processor 210, a memory 220, a positioning signal receiver 230, and an interface 240. The mobile device 200 may optionally include other components 290.

The processor 210 may include one or more microprocessors, microcontrollers, and/or digital signal processors that provide processing functions, as well as other calculation and control functionality. The memory 220 may be configured to store data and/or instructions for executing programmed functionality within the mobile device 200. The memory 220 may include on-board memory that is, for example, in a same integrated circuit package as the processor 210. Additionally or alternatively, memory 220 may be external to the processor 210 and functionally coupled over the common bus 201.

The positioning signal receiver 230 may be configured to receive one or more positioning signals 231 from a transmitting device, for example, a transmitting device analogous to the transmitting devices 120, 130, 140 depicted in FIG. 1. The positioning signal receiver 230 may be further configured to estimate range measurements based on the one or more positioning signals 231. The range measurements estimated by the positioning signal receiver 230 may indicate a distance between the mobile device 200 and the particular transmitting device from which a particular positioning signal of the one or more positioning signals 231 was received. The positioning signal receiver 230 may be configured to receive the one or more positioning signals 231 using, for example, one or more antennas, one or more filters, one or more demodulators, a receiver clock, and/or any other suitable hardware.

The positioning signal receiver 230 may further comprise any suitable hardware and/or software for receiving, processing, and/or storing the received positioning signals. In some implementations, the positioning signal receiver 230 may comprise a processor and a memory that are analogous in some respects to the processor 210 and the memory 220 described above.

The interface 240 may be used to provide interface data 241 of the mobile device 200 to an external entity. For example, the interface 240 may comprise a user interface and the interface data 241 may include audio output, visual output, tactile output, or any other output suitable for a user of the mobile device 200 (for example, a screen, a speaker, etc.). Additionally or alternatively, the interface data 241 may include audio input, visual input, tactile input, or any other suitable input from a user of the mobile device 200 (for example, from a microphone, a touch screen, a keyboard, a button, etc.). Additionally or alternatively, the interface 240 may comprise an electrical coupling and the interface data 241 may include one or more signals (for example, a sensed position of the mobile device 200) to another device (for example, an external user interface, a vehicle, etc.). Additionally or alternatively, the interface 240 may comprise a transceiver and the interface data 241 may include one or more transmitted signals (for example, a sensed position of the mobile device 200).

The other components 290 may include, for example, wide area network transceivers, local area network transceivers, or any other components suitable for inclusion in a mobile device such as the mobile device 200. It will be understood that the mobile device 200 may be a music player, a video player, an entertainment unit, a navigation device, a communications device, a mobile device, a mobile phone, a smartphone, a personal digital assistant, a fixed location terminal, a tablet computer, a computer, a wearable device, an Internet of things (IoT) device, a laptop computer, a server, a device in a automotive vehicle, and/or any other device with a need for position sensing capability. As such, the mobile device 200 may include any number of other components 290.

Figure 3:
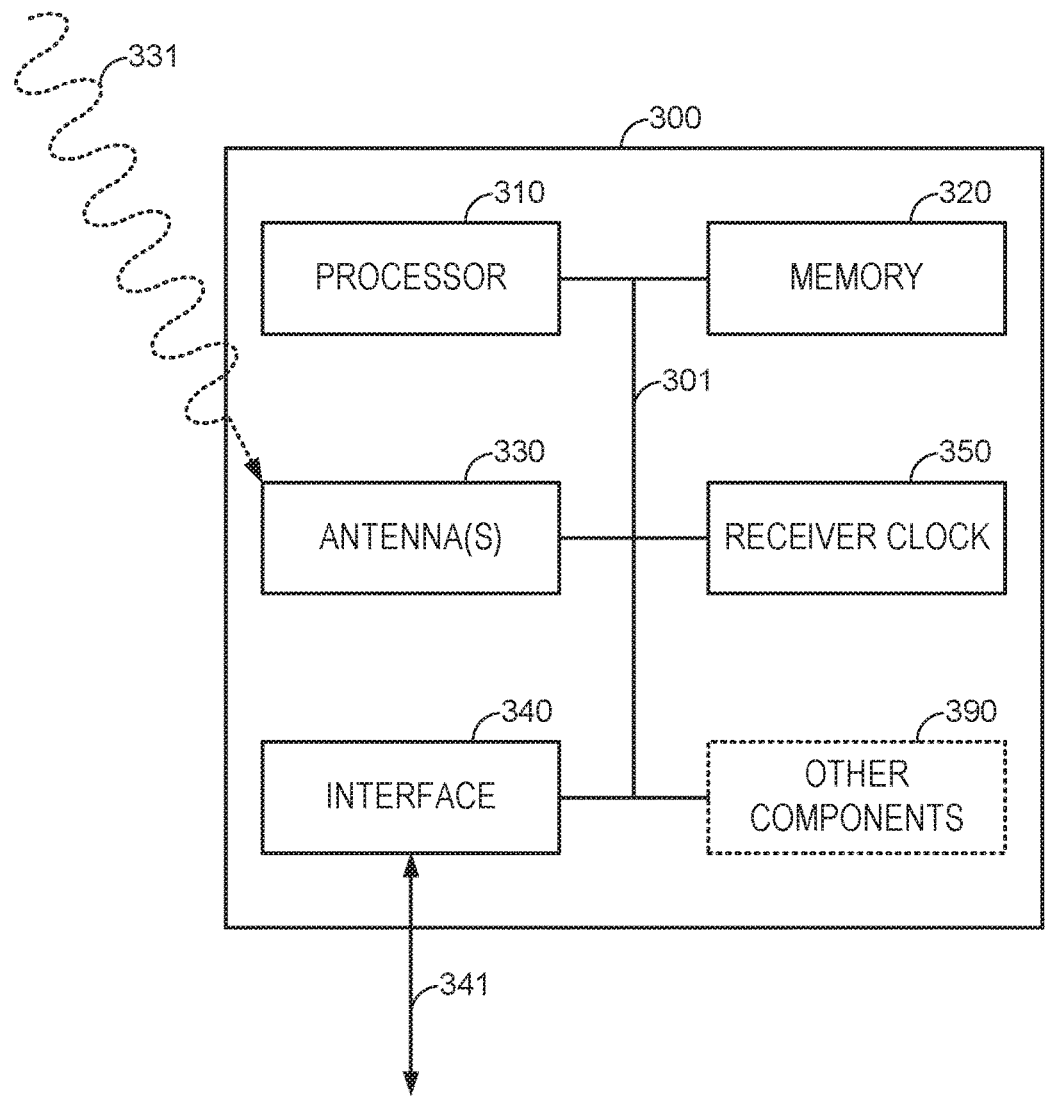
FIG. 3 generally illustrates a positioning signal receiver having conventional position sensing capabilities.

FIG. 3 generally illustrates a positioning signal receiver 300 having conventional position sensing capabilities. The positioning signal receiver 300 may be analogous to, for example, the positioning signal receiver 230 depicted in FIG. 2. Accordingly, the positioning signal receiver 300 may be incorporated into a mobile device analogous to, for example, the mobile device 200 depicted in FIG. 2. The positioning signal receiver 300 may comprise a processor 310, a memory 320, an antenna 330, an interface 340, a receiver clock 350, and other components 390.

The processor 310 and the memory 320 may be analogous in some respects to the processor 210 and the memory 220 described above. The processor 310 and/or memory 320 may be configured to process and/or store the signals received by the antenna 330. The processor 310 and/or memory 320 may be further configured to generate position data 341 indicating a position of the positioning signal receiver 300. The position data 341 may be provided by the processor 310 and/or memory 320 to the interface 340. The interface 340 may be used to provide the position data 341 to an external entity, for example, the common bus 201 of the mobile device 200.

The antenna 330 may be configured to receive one or more positioning signals 331. In some implementations, the antenna 330 may include a plurality of antennas, for example, one or more main antennas and/or one or more reference antennas. However, for simplicity of illustration, the one or more antennas included in the positioning signal receiver 300 will be referred to in the singular as the antenna 330. The one or more positioning signals 331 may be analogous to the positioning signals 121, 131, 141 depicted in FIG. 1 and may be received from transmitting devices analogous to the transmitting devices 120, 130, 140 depicted in FIG. 1. The antenna 330 may be configured to receive the one or more positioning signals 331 continuously over a period of time.

In some implementations, the one or more positioning signals 331 may include a pseudo-random noise (PRN) code. Each transmitting device may be associated with a unique and/or specific code. The memory 320 may store a plurality of replica codes and the identity and/or position of a specific transmitting device to which each of the replica codes corresponds. For example, "$CODE_{120}$" may correspond to the transmitting device 120, "$CODE_{130}$" may correspond to the transmitting device 130, "$CODE_{140}$" may correspond to the transmitting device 140, etc. If, for example, the positioning signal 121 is received at the antenna 330, then the positioning signal 121 may include the "$CODE_{120}$" identifying the transmitting device 120. To recognize the $CODE_{120}$, the positioning signal receiver 300 may correlate the received positioning signal 121 with one or more of the replica codes $CODE_{120}$, $CODE_{130}$, $CODE_{140}$, etc. The positioning signal receiver 300 may be configured to determine, based on the correlating, that the positioning signal 121 includes the $CODE_{120}$, and was therefore received from the transmitting device 120. Moreover, the timing of the correlating may be used to estimate the distance from the transmitting device 120 to the positioning signal receiver 300, as will be discussed in greater detail below.

The receiver clock 350 may be configured to keep time. The receiver clock 350 may be synchronized with a transmitter clock incorporated into the transmitting device 120. In some implementations, each of the transmitting devices 120, 130, 140 may be equipped with a high-precision transmitter clock, for example, an atomic clock. The transmitter clocks in each of the transmitting devices 120, 130, 140 may be synchronized. In some implementations, the receiver clock 350 may be less precise than an atomic clock, and the lack of precision associated with the receiver clock 350 may be referred to as receiver clock bias.

The start time $t_T$ for the transmission of a particular code may be predetermined and known to, for example, the positioning signal receiver 300. Moreover, the receiver clock 350 may be configured to determine a time $t_R$ at which a particular code, for example, the $CODE_{120}$, is received. Accordingly, the delay $t_{TOF}$ caused by the time of flight of the positioning signal 121 from the transmitting device 120 to the antenna 330 may be determined based on the predetermined transmission time $t_T$ and the receiving time $t_R$. In particular, the delay $t_{TOF}$ may be equal to $t_R - t_T$.

For example, "$CODE_{120}$" may have a 1.00 ms duration and may be transmitted at 1.00 ms intervals beginning at a transmission start time $t_0$. Accordingly, "$CODE_{120}$" will be transmitted at a plurality of transmitting times $t_T$, wherein $t_T = t_0 + N*(1.00 \text{ ms})$, N being an integer. As noted above, the transmission start time $t_0$ may be scheduled or predetermined such that it is known in advance by both the transmitting device 120 and the positioning signal receiver 300.

The positioning signal 121 may travel from the transmitting device to the antenna 330 at the speed of light and may reach the antenna 330 after a delay $t_{TOF}$ caused by the time of flight. For example, suppose that $CODE_{120}$ is transmitted at a predetermined transmitting time $t_T = 1.00$ ms, and that the receiver clock 350 determines that the code is received at receiving time $t_R = 1.20$ ms. The positioning signal receiver 300 may therefore conclude that the delay $t_{TOF}$ is equal to 0.20 ms. Because the speed of light is ~300 km/ms, a delay $t_{TOF}$ equal to 0.20 ms would indicate a distance of ~60 km. The estimated distance may be referred to as a "range estimate", a "pseudorange", and/or a "code-phase measurement". It will be understood that this is a simplified description of how the positioning signal receiver 300 estimates a code-phase measurement, and that other factors affecting the estimating of the code-phase measurement have been omitted for brevity.

As noted above, each transmitting device may be associated with a different PRN code. Accordingly, the positioning signal receiver 300 may perform a plurality of code-phase measurements based on a plurality of the one or more positioning signals 331, each code-phase measurement corresponding to a different transmitting device. After, for example, three or more code-phase measurements are performed, the position of the positioning signal receiver 300 can be calculated using triangulation based on the known positions of the three or more corresponding transmitting devices. In some implementations, code-phase measurements may be used to sense a position of the positioning signal receiver 300 with precision on the order of several meters.

The positioning signal receiver 300 can achieve greater precision using carrier-phase measurements. As noted above, each of the one or more positioning signals 331 may include a repeating PRN code used for generating code-phase measurements. However, the code cycle may have a first frequency and may be carried on a carrier wave having a second frequency that is significantly greater than the first frequency. Because the frequency of the carrier wave is greater than the frequency of the code cycle, position sensing that is based on carrier-phase measurements may be more precise than position sensing based on code-phase measurements. For example, if the delay $t_{TOF}$ can be determined using the carrier wave, then the positioning signal receiver 300 may be able to sense position with precision on the order of tens of centimeters.

The carrier wave received at the antenna 330 may be denoted $C_R(t)$ and may be delayed with respect to the carrier wave $C_T(t)$ transmitted by the transmitting device, such that $C_R(t)=C_T(t-t_{TOF})$. Because the timing and frequency of the transmitted carrier wave $C_T(t)$ are predetermined and/or known to the positioning signal receiver 300, and because the receiver clock 350 is synchronized with an analogous transmitter clock incorporated in the transmitting device, the positioning signal receiver 300 may be configured to replicate the transmitted carrier wave $C_T(t)$, and thereby measure a phase difference $\phi$ between the transmitted carrier wave $C_T(t)$ and the received carrier wave $C_R(t)$. The phase difference $\phi$ may be measured in cycles and may be referred to as a fractional carrier phase measurement.

However, the carrier wave may have a repeating pattern with a period $T_{CW}$, and the delay $t_{TOF}$ may be significantly greater than the period $T_{CW}$. Accordingly, the delay $t_{TOF}$ may not be determinable based solely on the measured phase difference $\phi$. In particular, because the delay $t_{TOF}$ may be greater than the period $T_{CW}$, the phase difference $\phi$ may only constitute a fraction of the delay $t_{TOF}$. The remainder of the delay $t_{TOF}$ may consist of a plurality of full cycles of the repeating carrier wave. Accordingly, the delay $t_{TOF}$ may include the measured phase difference $\phi$ and an unknown integer number of full cycles of the carrier wave. The unknown integer number of full cycles may be referred to as an integer ambiguity and may be denoted M. Accordingly, a precise estimate of the delay $t_{TOF}$ can be determined based on the equation $t_{TOF}=T_{CW}*(M+\phi)$, where $T_{CW}$ is predetermined and known, and $\phi$ can be measured. However, the integer ambiguity M must be resolved before the delay $t_{TOF}$ can be determined.

Figure 4:
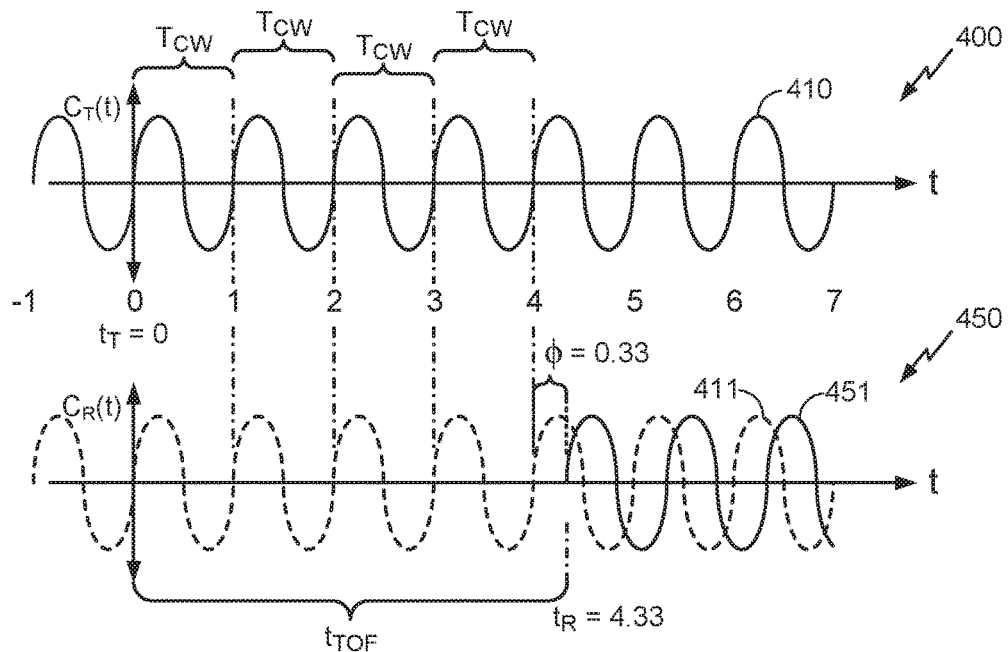
FIG. 4 generally illustrates an integer ambiguity as it relates to a carrier wave of a positioning signal.

FIG. 4 generally illustrates the integer ambiguity M as it relates to a carrier wave of a positioning signal. FIG. 4 includes a graph 400 showing a transmitted carrier wave 410 corresponding to the transmitted carrier wave $C_T(t)$ described above. The transmitted carrier wave 410 is transmitted continuously over time by a transmitter device analogous to, for example, the transmitting device 120 depicted in FIG. 1. As noted above, the frequency and phase (relative to absolute time) of the transmitted carrier wave 410 may be predetermined and known.

FIG. 4 further includes a graph 450 showing a received carrier wave 451 corresponding to the received carrier wave $C_R(t)$ described above. The received carrier wave 451 may be received by an antenna analogous to the antenna 330 depicted in FIG. 3.

The time axes in graphs 400, 450 are divided into arbitrary units (AU) of time labeled −1, 0, 1, 2 . . . 7. For simplicity of illustration, the length of a single AU happens to be equal to the period of the transmitted carrier wave 410. In the scenario depicted in FIG. 4, a full cycle that is transmitted by the transmitting device 120 beginning at $t_T$=0.00 travels for 4.33 AU before it reaches the antenna 330 ($t_R$=4.33). Accordingly, there is a delay $t_{TOF}$ equal to 4.33 ($t_R-t_T$). However, as will be discussed in greater detail below, the delay $t_{TOF}$ cannot be determined until an integer ambiguity is resolved.

As noted above, the frequency and phase (relative to absolute time) of the transmitted carrier wave 410 may be predetermined and known. Therefore, the positioning signal receiver 300 may be capable of generating a replica transmission wave 411 (indicated in the graph 450 as a dashed line) that replicates the transmitted carrier wave 410. The positioning signal receiver 300 can then measure a phase difference $\phi$ between the received carrier wave 451 and the replica transmission wave 411. However, from the perspective of the positioning signal receiver 300, the full cycle transmitted at $t_T$=0.00 is indistinguishable from the full cycles transmitted at other transmission times $t_T$=−1.00, +1.00, +2.00, +3.00, etc. Accordingly, the phase difference $\phi$ measured by the positioning signal receiver 300 will be 0.33. In this instance, the period $T_{CW}$ is known (1.00) and the phase difference $\phi$ has been measured (0.33), but the integer ambiguity M has not yet been resolved. Therefore, the positioning signal receiver 300 can determine that the delay $t_{TOF}$ is equal to 1.00*(M+0.33), where M is an integer. However, the positioning signal receiver 300 must resolve the integer ambiguity M before determining the delay $t_{TOF}$.

There are several available techniques for resolving the integer ambiguity M. For example, a double differences technique uses two antennas, wherein each antenna measures, at a particular time (for example, an epoch), a first phase difference $\phi_1$ associated with a first transmitting device (for example, the transmitting device 120) and a second phase difference $\phi_2$ associated with a second transmitting device (for example, the transmitting device 130). The difference between the first phase difference $\phi_1$ and the second phase difference $\phi_2$ is determined for each antenna, and the difference between the differences is calculated to generate an observation vector. A plurality of observation vectors are generated over a particular duration (for example, a plurality of epochs). For brevity, the details will be omitted here, but it will be understood that with a sufficiently large number of observations (over a sufficiently long period of time) from a sufficiently large number of transmitting devices, mathematical techniques can be used to determine the integer ambiguity M. Other techniques apart from the double differences technique are available for resolving the integer ambiguity M, but it will be understood that these other techniques also require a large number of observations over a long period of time. Accordingly, integer ambiguity resolution according to known techniques can be computationally intensive and time-consuming.

Once the integer ambiguity M is resolved, the delay $t_{TOF}$ can be estimated. As noted above, the code-phase measurements may be used to determine the delay $t_{TOF}$ with a certain degree of precision, for example, on the order of several meters. However, once the integer ambiguity M is resolved, the delay $t_{TOF}$ can be determined with a greater degree of precision, for example, on the order of tens of centimeters.

Figure 5:
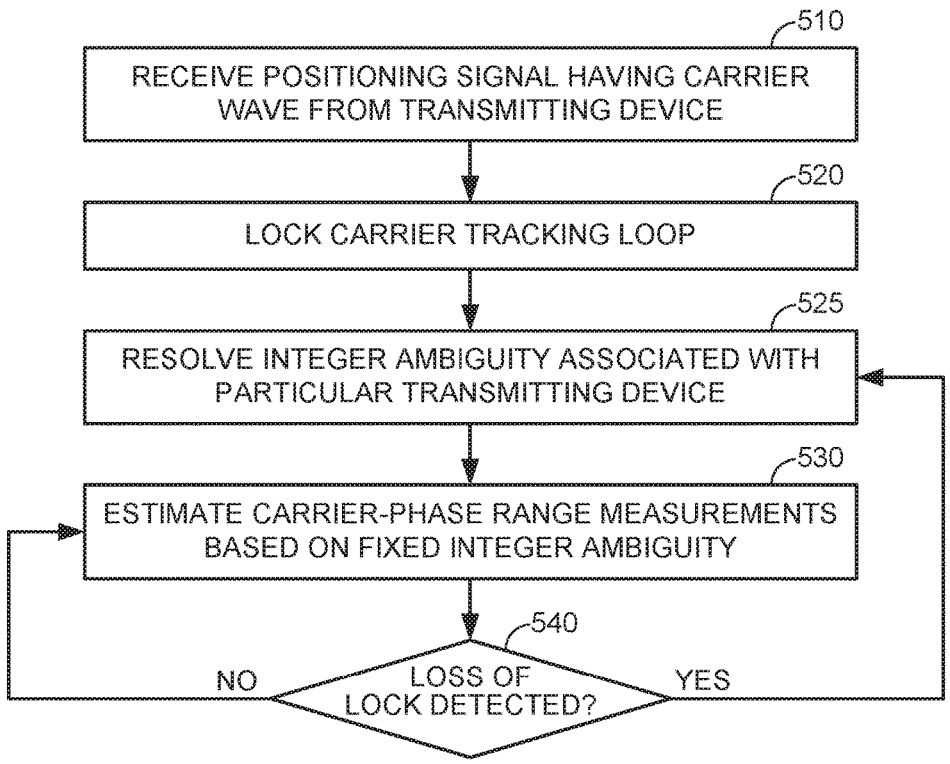
FIG. 5 generally illustrates a method for tracking an integer ambiguity in accordance with a conventional technique.

FIG. 5 generally illustrates a method 500 for tracking an integer ambiguity in accordance with a conventional technique.

At 510, the method 500 receives a positioning signal having a carrier wave from a particular transmitting device. The particular transmitting device may be analogous to the transmitting devices 120, 130, 140 depicted in FIG. 1. The carrier wave may be analogous to, for example, the received carrier wave 451 depicted in FIG. 4. The receiving at 510 may be performed by, for example, the positioning signal receiver 300 depicted in FIG. 3.

At 520, the method 500 locks a carrier tracking loop associated with the positioning signal received at 510. The carrier tracking loop may be implemented using, for example, the positioning signal receiver 300 depicted in FIG. 3. The carrier tracking loop may be a phase-locked loop that continuously tracks a measured phase difference ϕ between a received carrier wave (analogous to the received carrier wave 451) and a replica transmission wave (analogous to the replica transmission wave 411). As noted above, the positioning signal received at 510 may be associated with a particular transmitting device, for example, a particular satellite in an SPS constellation. As used herein, the term "locked transmitting device" may refer to a transmitting device from which positioning signals are received, wherein a carrier tracking loop associated with the positioning signals is locked.

At 525, the method 500 resolves an integer ambiguity associated with the particular transmitting device. The resolving at 525 may be performed by, for example, the positioning signal receiver 300 depicted in FIG. 3. The resolving at 525 may be based on positioning signals analogous to the positioning signals 121, 131, 141 and may be performed using any of the techniques described above. However, as noted above, these techniques can be computationally intensive and time-consuming. For as long as the carrier tracking loop is locked (as at 520), the integer ambiguity may remain fixed at the resolved value.

At 530, the method 500 estimates carrier-phase range measurements based on the fixed integer ambiguity. As noted above, the delay $t_{TOF}$ may be a function of the integer ambiguity M, the period of the carrier wave $T_{CW}$, and the phase difference ϕ, wherein $t_{TOF}=T_{CW}*(M+\phi)$. The period $T_{CW}$ may be constant, and the integer ambiguity M remains fixed for as long as the carrier tracking loop is locked. Therefore, so long as the carrier tracking loop is locked as at 520, the delay $t_{TOF}$ may be determined as a function of the tracked measurements of the phase difference ϕ. The carrier-phase range measurement estimated at 530 may be used to sense position.

At 540, the method 500 detects a loss of lock. Loss of lock may occur when the phase difference ϕ can not be tracked. If no loss of lock is detected ('no' at 540), then the method 500 may return to the estimating at 530. Because lock is not lost, the integer ambiguity remains fixed and the delay $t_{TOF}$ can be continuously determined using carrier-phase measurements.

However, if a loss of lock is detected ('yes' at 540), then the method 500 may return to the resolving at 525. For example, returning to FIG. 1, consider a scenario where the mobile device 110 has acquired the positioning signal 141 prior to entering the position sensing environment 100. In this scenario, the mobile device 110 resolves the integer ambiguity as at 525. But, upon entering the position sensing environment 100, the positioning signal 141 is blocked or reflected. As a result, the phase difference ϕ associated with the positioning signal 141 can no longer be tracked, and a loss of lock is detected. After the mobile device 110 exits the position sensing environment 100, the positioning signal 141 may be re-acquired, the carrier tracking loop may be re-locked, and the integer ambiguity may be resolved again. However, as noted above, available techniques for resolving the integer ambiguity may be computationally intensive and time-consuming. Moreover, in some urban canyon scenarios, the positioning signal 141 may only be re-acquired for a brief period of time before it is once again blocked or reflected. Accordingly, the method 500 may be stuck at 525 for an indefinite period of time. Until such time as the positioning signal 141 can be re-acquired long enough to perform the resolving at 525, the mobile device 110 may not be capable of precise position sensing based on carrier-phase measurements. In some implementations, a loss of lock may be referred to as a cycle slip.

Figure 6:
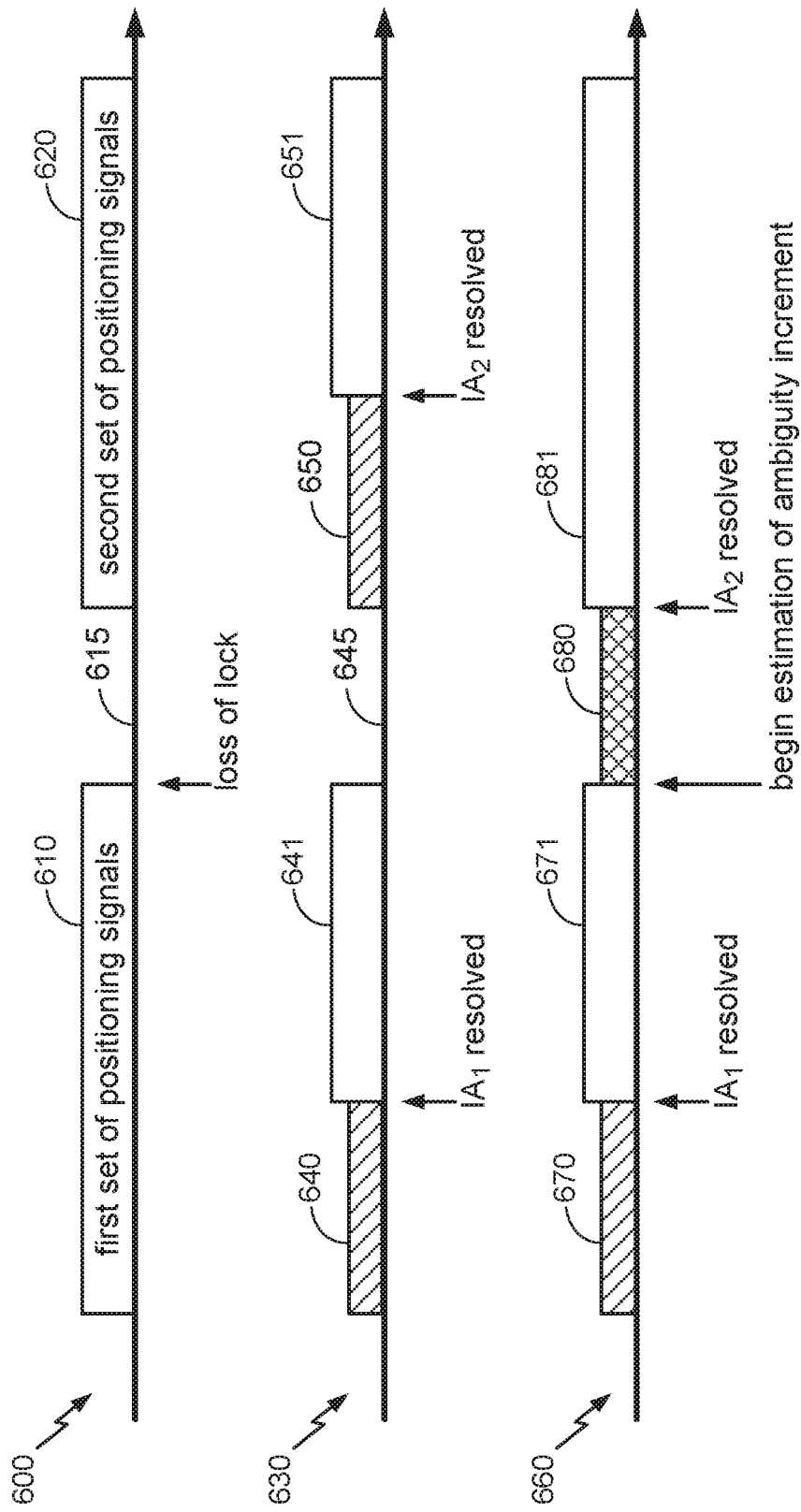
FIG. 6 generally illustrates a series of timing diagrams demonstrating repair of carrier-phase cycle slips in accordance with aspects of the disclosure.

FIG. 6 generally illustrates a series of timing diagrams demonstrating repair of carrier-phase cycle slips in accordance with aspects of the disclosure. FIG. 6 includes a positioning signal reception timing diagram 600, a conventional cycle slip repair timing diagram 630, and a rapid cycle slip repair timing diagram 660. The mobile device 200 depicted in FIG. 2 may perform cycle slip repair using the conventional technique depicted in FIG. 5. This approach may result in cycle slip repair analogous to the conventional cycle slip repair timing diagram 630. By contrast, a mobile device configured to operate in accordance with aspects of the disclosure (as will be described below with respect to FIG. 7) may be configured to perform rapid cycle slip repair as demonstrated by the rapid cycle slip repair timing diagram 660.

The positioning signal reception timing diagram 600 depicts a first receiving period 610, a non-reception period 615, and a second receiving period 620. During the first receiving period 610, the mobile devices may receive a first set of positioning signals from a transmitting device. During the first receiving period 610, the transmitting device may be similar to the transmitting devices 120, 130 depicted in FIG. 1. However, during the non-reception period 615, positioning signals from the transmitting device may be blocked or reflected. Accordingly, during the non-reception period 615, the transmitting device may be similar to the transmitting device 140 depicted in FIG. 1. During the second receiving period 620, the blocking/reflection ceases, and the mobile devices may once again receive positioning signals from the transmitting device, referred to herein as a second set of positioning signals.

The conventional cycle slip repair timing diagram 630 depicts a first integer ambiguity resolution period 640 and a first carrier-phase range sensing period 641 that coincide with the first receiving period 610. During the first integer ambiguity resolution period 640, the mobile device 200 may resolve a first integer ambiguity (labeled $IA_1$) using conventional techniques. For example, after receiving the first set of positioning signals, the mobile device 200 may lock a first carrier tracking loop (analogous to the locking at 520 depicted in FIG. 5) and then resolve the first ambiguity increment (analogous to the resolving at 525 depicted in FIG. 5). As noted above, conventional techniques for integer ambiguity resolution may be computationally intensive and time-consuming. Once the first integer ambiguity $IA_1$ is resolved, the first integer ambiguity may be fixed and carrier-phase measurements associated with the transmitting device may be used to, for example, sense a position of the mobile device 200. As noted above, carrier-phase measurements may enable high precision range sensing, for example, precision on the order of tens of centimeters. During the non-reception period 615, the mobile device 200 can no longer perform range measurements based on the first set of positioning signals received from the transmitting device. Accordingly, the mobile device 200 experiences a carrier-phase range sensing outage period 645. After the second set of positioning signals is received, the mobile device 200 once again performs integer ambiguity resolution during a second integer ambiguity resolution period 650 analogous to the first integer ambiguity resolution period 640. After the second integer ambiguity $IA_2$ is resolved, the mobile device 200 can once again use carrier-phase measurements associated with the transmitting device to, for example, sense a position of the mobile device 200.

The rapid cycle slip repair timing diagram 660 depicts a first integer ambiguity resolution period 670 that may be analogous to the first integer ambiguity resolution period 640 and the first carrier-phase range sensing period 641, respectively, of the conventional cycle slip repair timing diagram 630. However, after the loss of lock occurs (marking the beginning of the non-reception period 615), a mobile device configured for rapid repair may, in accordance with aspects of the disclosure, be configured to estimate an ambiguity increment during an ambiguity increment estimation period 680. The estimating of the ambiguity increment may be performed during the non-reception period 615 and may facilitate rapid repair of the cycle slip once reception of positioning signals resumes. Accordingly, after the mobile device configured for rapid repair receives the second set of positioning signals during the second receiving period 620, the ambiguity increment estimated during the ambiguity increment estimation period 680 can be used to rapidly resolve the second integer ambiguity $IA_2$. Accordingly, a second carrier-phase range sensing period 681 may commence soon after the non-reception period 615 ends.

By comparison of the rapid cycle slip repair timing diagram 660 to the conventional cycle slip repair timing diagram 630, it will be understood that during the second integer ambiguity resolution period 650, the mobile device 200 is once again performing the computationally intensive and time-consuming process of conventional integer ambiguity resolution, whereas the rapid-repair mobile device has quickly resumed high-precision range sensing based on carrier-phase measurements.

Figure 7:
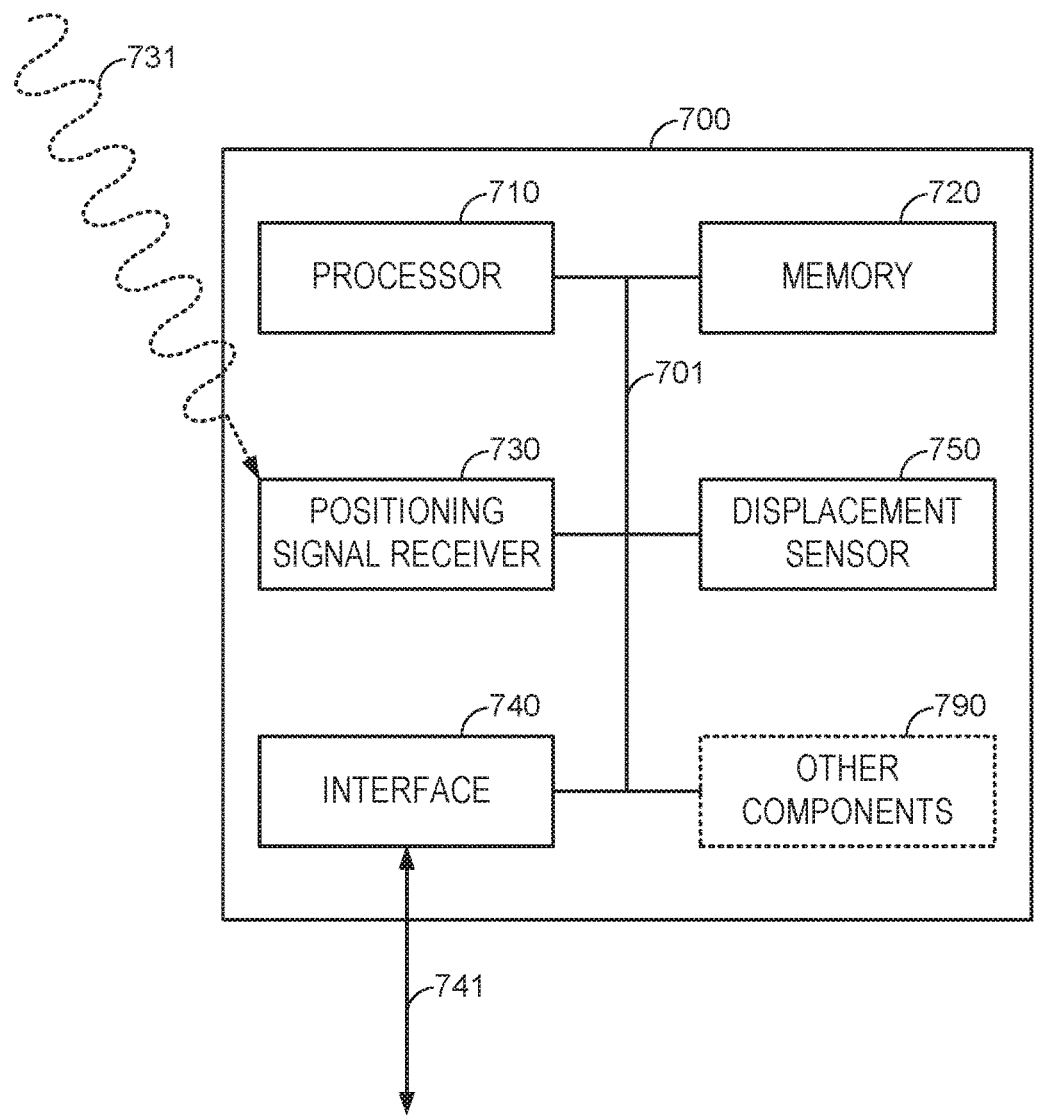
FIG. 7 generally illustrates a mobile device in accordance with aspects of the disclosure.

FIG. 7 generally illustrates a mobile device 700 in accordance with aspects of the disclosure. The mobile device 700 may be analogous in some respects to the mobile device 200 depicted in FIG. 2. However, the mobile device 700 may also be configured to perform rapid repair of cycle slips as described above with respect to the rapid cycle slip repair timing diagram 760.

The mobile device 700 may include a processor 710 and a memory 720 analogous to the processor 210 and the memory 220, respectively, a positioning signal receiver 730 and an interface 740 analogous to the positioning signal receiver 230 and the interface 240, respectively, and other components 790 analogous to the other components 290. The positioning signal receiver 730 may be configured to receive one or more positioning signals 731 analogous to the one or more positioning signals 231, and the interface 740 may be configured to exchange interface data 741 analogous to the interface data 241. Although the aforementioned components of the mobile device 700 may be analogous in some respects, it will be understood that the mobile device 700 provides several advantages relative to the mobile device 200, as will be discussed in greater detail below.

Unlike the mobile device 200, the mobile device 700 may further include a displacement sensor 750 configured to generate spatial-based displacement data. The spatial-based displacement data may indicate a relative change in a position of the displacement sensor 750 over time, for example, from a first portion of a period of time to a second portion of the period of time subsequent to the first portion of the period of time. The displacement sensor 750 may include any suitable sensor for sensing displacement. For example, the displacement sensor 750 may comprise a visual-inertial odometry sensor, one or more cameras, one or more LIDAR sensors, one or more accelerometers, one or more gyroscopes, one or more compasses, or any combination thereof. One or more of the accelerometers, gyroscopes, and/or compasses may be incorporated in an inertial measurement unit (IMU).

The positioning signal receiver 730 may be configured to receive positioning signals 731 analogous to the positioning signals 331 depicted in FIG. 3. The positioning signals 731 may be received from a transmitting device analogous to, for example, the transmitting device 120 depicted in FIG. 1. The positioning signals 731 may include a first set of positioning signals from a transmitting device and a second set of positioning signals from the transmitting device. The first set of positioning signals may be received during a first period of time (analogous to the first receiving period 610) and the second set of positioning signals may be received during a second period of time subsequent to the first period of time (analogous to the second receiving period 620). The positioning signal receiver 730 may be configured to estimate first range measurements to the transmitting device based on the first set of positioning signals, the first range measurements including a first set of carrier-phase measurements, and may be further configured to estimate second range measurements to the transmitting device based on the second set of positioning signals, the second range measurements including a second set of carrier-phase measurements.

The processor 710 and/or memory 720 may be configured to lock a first carrier tracking loop during the first period of time based on the first set of positioning signals. The locking of the first carrier tracking loop may be analogous to the locking depicted at 520 of FIG. 5. The processor 710 and/or memory 720 may be further configured to resolve a first integer ambiguity. The resolving may be analogous to the resolving depicted at 525 of FIG. 5 and may be performed during a period analogous to the first integer ambiguity resolution period 670 depicted in FIG. 6. The first integer ambiguity may be associated with the particular transmitting device from which the first set of positioning signals are received. The processor 710 and/or memory 720 may be further configured to detect a loss of lock of the first carrier tracking loop. The detecting may be analogous to the detecting depicted at 540 of FIG. 5.

The processor 710 and/or memory 720 may be further configured to track the first integer ambiguity with a Kalman filter, wherein the first integer ambiguity is tracked by the Kalman filter as an integer ambiguity state variable associated with the transmitting device.

The processor 710 and/or memory 720 may be further configured to sense a first position of the mobile device 700 based on the first set of carrier-phase measurements and the first integer ambiguity.

The processor 710 and/or memory 720 may be further configured to detect a loss of lock of a first carrier tracking loop associated with the first set of carrier-phase measurements, wherein the first carrier tracking loop is associated with a first integer ambiguity. The loss of lock detected by the processor 710 and/or memory 720 may be analogous to the loss of lock that commences the non-reception period 615 depicted in FIG. 6.

The processor 710 and/or memory 720 may be further configured to estimate, based on the displacement data, an ambiguity increment to the first integer ambiguity subsequent to the detected loss of lock. The ambiguity increment may be estimated using any suitable technique in accordance with aspects of the disclosure. In some implementations, the estimating of the ambiguity increment may be based on the spatial-based displacement data generated by the displacement sensor 750. In some implementations, the estimating of the ambiguity increment may be based by solving an integer least-squares problem associated with the displacement data. The estimating of the ambiguity increment may be performed during a period of time analogous to the non-reception period 615 depicted in FIG. 6. In particular, the estimating of the ambiguity increment may be performed during a period of time subsequent to the detected loss of lock, between a first period of time during which the first set of positioning signals are received from the transmitting device and a second period of time during which the second set of positioning signals are received from the transmitting device.

The processor 710 and/or memory 720 may be further configured to track the ambiguity increment with a Kalman filter, wherein the ambiguity increment is tracked by the Kalman filter as an ambiguity increment state variable associated with the transmitting device.

The processor 710 and/or memory 720 may be further configured to resolve a second integer ambiguity associated with the second set of positioning signals based on the first integer ambiguity and the estimated ambiguity increment. It will be understood that whereas the resolving of the first integer ambiguity may be based on the first set of positioning signals received during the first period of time and may be performed using a technique analogous to the resolving depicted at 525 of FIG. 5, the resolving of the second integer ambiguity is instead based on the first integer ambiguity and the estimated ambiguity increment. In some implementations, the resolving of the second integer ambiguity may be performed more rapidly than the resolving of the first integer ambiguity. This may be the result of tracking of the ambiguity increment the spatial-based displacement data in accordance with aspects of the disclosure.

The processor 710 and/or memory 720 may be configured to lock a second carrier tracking loop during the second period of time, wherein the second integer ambiguity is fixed after the second carrier tracking loop is locked. The locking may be analogous to the locking depicted at 520 of FIG. 5. The processor 710 and/or memory 720 may be further configured to sense a second position of the mobile device 700 based on the second set of carrier-phase measurements and the second integer ambiguity.

In the description of FIG. 7, and in the remainder of the present disclosure, one or more operations may be described as being performed by the processor 710 and/or memory 720. Although the singular is used, it will be understood that "processor" may refer to one or more processors without departing from the scope of the present disclosure. Moreover, "memory" may refer to one or more units of memory without departing from the scope of the present disclosure. Accordingly, any function or operation of the mobile device 700 that is described in the present disclosure as being performed by processor 710 and/or memory 720 may be performed, without departing from the scope of the present disclosure, by any number of processors and/or any number of memories. For example, the functions or operation of the mobile device 700 described in the present disclosure may be performed by the processor 710 and/or the memory 720, a processor and/or memory associated with the positioning signal receiver 730, a processor and/or memory associated with another component of the mobile device 700, or by any combination thereof.

Figure 8:
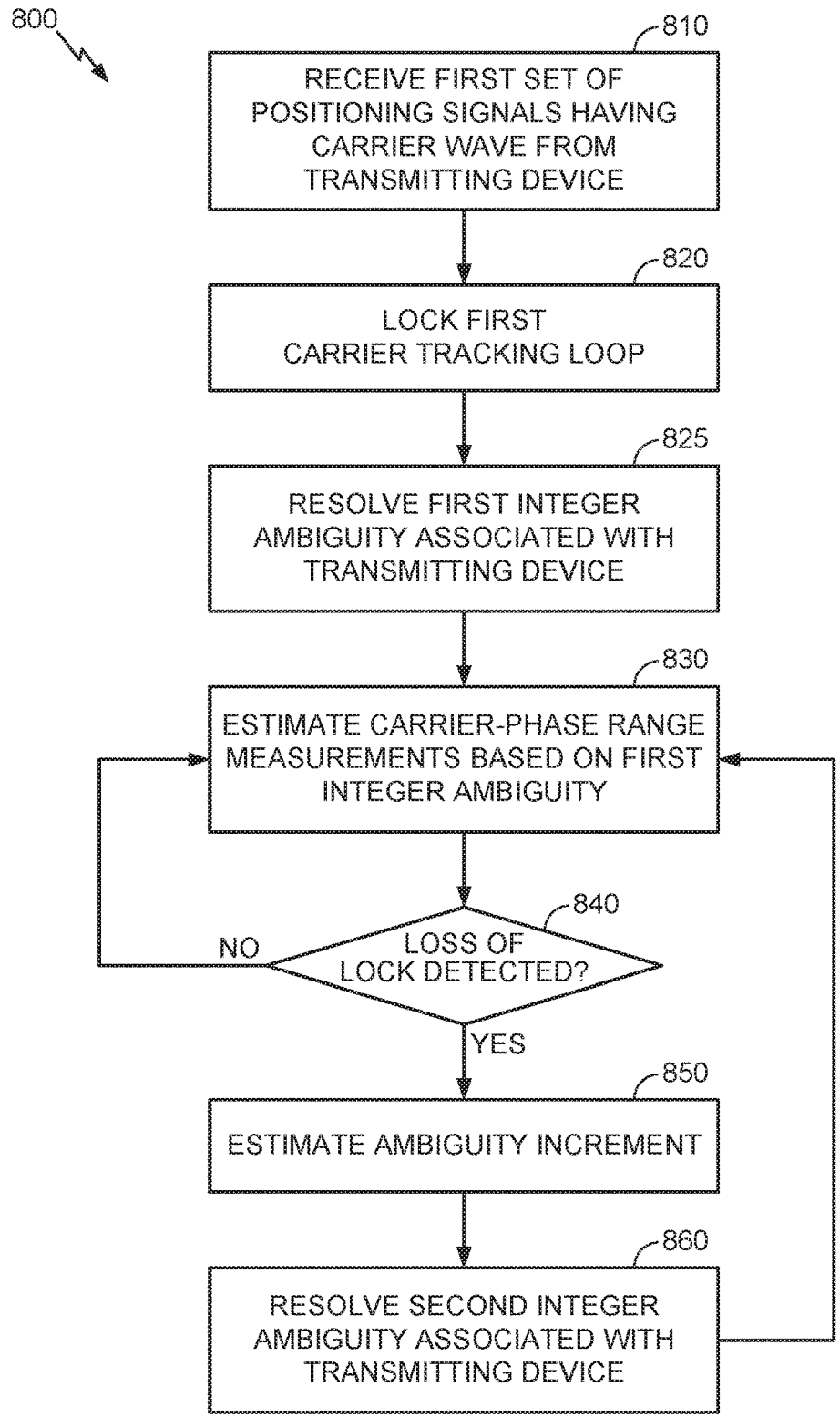
FIG. 8 generally illustrates a method for use in position sensing in accordance with aspects of the disclosure.

FIG. 8 generally illustrates a method 800 for use in position sensing in accordance with aspects of the disclosure. The method 800 will be described as it would be performed by, for example, the mobile device 700 depicted in FIG. 7.

At 810, the mobile device 700 receives a first set of positioning signals having a carrier wave from a transmitting device. The particular transmitting device may be analogous to the transmitting devices 120, 130, 140 depicted in FIG. 1. The carrier wave may be analogous to, for example, the received carrier wave 451 depicted in FIG. 4. The receiving at 510 may be performed by, for example, the positioning signal receiver 730 depicted in FIG. 7. Accordingly, it will be understood that the positioning signal receiver 730 may constitute means for receiving a first set of positioning signals having a carrier wave from a transmitting device.

At 820, the mobile device 700 locks a first carrier tracking loop associated with the first set of positioning signals received at 810. The locking at 820 may be performed by, for example, the positioning signal receiver 730 depicted in FIG. 7. Accordingly, it will be understood that the positioning signal receiver 730 may constitute means for locking a first carrier tracking loop.

At 825, the mobile device 700 resolves a first integer ambiguity associated with the transmitting device. The resolving at 825 may be performed by, for example, the processor 710 and/or memory 720 depicted in FIG. 7. Accordingly, it will be understood that the processor 710 and/or memory 720 may constitute means for resolving a first integer ambiguity associated with a transmitting device.

At 830, the mobile device 700 estimates carrier-phase range measurements based on the first integer ambiguity. The estimating at 830 may be performed by, for example, the processor 710 and/or memory 720 depicted in FIG. 7. Accordingly, it will be understood that the processor 710 and/or memory 720 may constitute means for estimating carrier-phase range measurements based on the first integer ambiguity.

At 840, the mobile device 700 determines whether a loss of lock has been detected. The determining at 840 may be performed by, for example, the processor 710 and/or memory 720 depicted in FIG. 7. Accordingly, it will be understood that the processor 710 and/or memory 720 may constitute means for determining whether a loss of lock has been detected. If the mobile device 700 determines that a loss of lock has not been detected ('no' at 840), then the method 800 returns to the estimating at 830. If the mobile device 700 determines that a loss of lock has occurred ('yes' at 850), then the method 800 proceeds to 850, as will be discussed in greater detail below.

At 850, the mobile device 700 estimates an ambiguity increment. The estimating at 850 may be performed by, for example, the processor 710 and/or memory 720 depicted in FIG. 7. Accordingly, it will be understood that the processor 710 and/or memory 720 may constitute means for estimating an ambiguity increment.

At 860, the mobile device 700 resolves a second integer ambiguity associated with the transmitting device. The resolving at 860 may be performed by, for example, the processor 710 and/or memory 720 depicted in FIG. 7. Accordingly, it will be understood that the processor 710 and/or memory 720 may constitute means for resolving a second integer ambiguity associated with the transmitting device.

Figure 9:
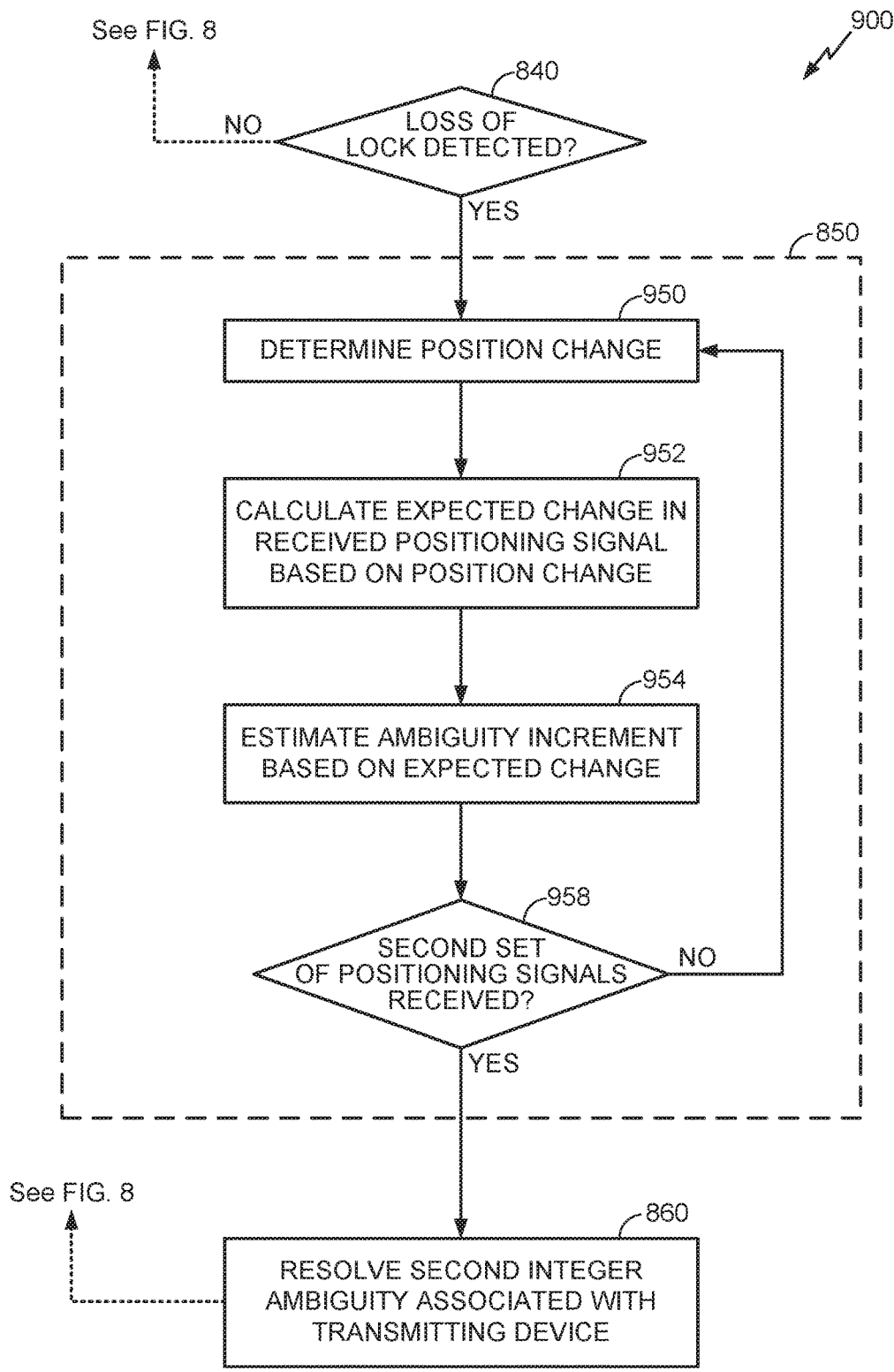
FIG. 9 generally illustrates a method for estimating an ambiguity increment in accordance with aspects of the disclosure.

FIG. 9 generally illustrates a method 900 for estimating an ambiguity increment in accordance with aspects of the disclosure. The method 900 may include one or more operations analogous to those described above in relation to FIG. 8. The method 900 will be described as it would be performed by the mobile device 700 depicted in FIG. 7.

As noted above, the method 900 may include one or more operations analogous to those described above in relation to FIG. 8. Recall that the method 800 may include resolving of a first integer ambiguity (as at 810) and locking of a first carrier tracking loop (as at 820), wherein the first integer ambiguity is fixed. However, if a loss of lock is detected ('yes' at 840), then the method 800 proceeds to 850, where an ambiguity increment is estimated, and 860, where a second integer ambiguity is resolved. As will be discussed in greater detail below, FIG. 9 generally illustrates an example implementation of the estimating at 850 including a plurality of operations labeled 950-958.

At 950, the mobile device 700 determines a position change. The determining at 950 may be performed on the basis of spatial-based displacement data generated by the displacement sensor 750. The position change may be a change over time, for example, from a past epoch to a present epoch. In some implementations, the past epoch may correspond to an epoch that is immediately prior to the present epoch. For example, the past epoch may correspond to the last epoch prior to the loss of lock detected at 840, and the present epoch may correspond to the first epoch after the loss of lock is detected at 840.

At 952, the mobile device 700 calculates an expected change in the received positioning signal based on the position change determined at 950. As noted above, a first set of positioning signals may be received at the mobile device 700 prior to the loss of lock detected at 840. Because the first set of positioning signals have been received, and because the first integer ambiguity has been resolved (as at 810), the characteristics of the first set of positioning signals (integer ambiguity M, phase difference $\phi$, etc.) may be known to the mobile device 700. In particular, the characteristics may include the last known characteristics (integer ambiguity M, phase difference $\phi$, etc.) obtained prior to loss of lock.

Because the location of the transmitting device is also known to the mobile device 700, it will be understood that a displacement of the mobile device 700 may have a predictable effect on the characteristics of the received positioning signals (change in integer ambiguity $\Delta M$, change in phase difference $\Delta\phi$, etc.). Accordingly, the mobile device 700 may be configured to estimate an expected change in the received positioning signal, based on the spatial-based displacement data generated by the displacement sensor 750, if the received positioning signal were received in the present epoch.

At 954, the mobile device 700 estimates an ambiguity increment based on the expected change estimated at 952. As noted above, a displacement of the mobile device 700 from the past epoch to the present epoch may have a predictable effect on the characteristics of the received positioning signals from the past epoch to the present epoch (change in integer ambiguity $\Delta M$, change in phase difference $\Delta\phi$, etc.). In some implementations, the change in integer ambiguity $\phi M$ calculated at 952 may serve as the ambiguity increment estimated at 954. In other implementations, the ambiguity increment may be estimated by solving a least-squares problem.

At 958, the mobile device 700 determines if a second set of positioning signals is received. In particular, the mobile device 700 may determine if a second set of positioning signals is received from the same transmitting device with which the loss of lock occurred at 840. If the second set of positioning signals has not been received ('no' at 958), then the method 900 returns to 950, where a new change in position is determined (at 950), a new expected change in a received positioning signal is calculated (at 952), and a new ambiguity increment is estimated (at 954). If the second set of positioning signals has been received ('yes' at 958), then the method 900 proceeds to 860.

As noted above with respect to FIG. 8, at 860, the mobile device 700 resolves a second integer ambiguity associated with the transmitting device. In particular, the mobile device 700 may resolve the second integer ambiguity by adding the ambiguity increment estimated at 954 to the first integer ambiguity resolved at 810.

As a simplified example provided solely for illustrative purposes, suppose that the mobile device 700 is exactly 44 kilometers (4,400,000 centimeters) from a particular transmitting device, for example, the transmitting device 140. Prior to entering the position sensing environment 100, the mobile device 700 resolves an integer ambiguity associated with a carrier wave of the transmitting device 140. In particular, the mobile device 700 determines, based on a known wavelength of the carrier wave (for example, ~19.0425 cm, corresponding to a carrier frequency of 1575.42 MHz), that there are 231,061.60 cycles of the carrier wave between the transmitting device 140 and the mobile device 700. In this scenario, the phase difference $\phi$ would be measured at $\phi=0.60$ and a first integer ambiguity $M_1$ would be resolved at $M_1=231,061$. Suppose further that these values are determined just before the mobile device 700 enters the position sensing environment 100 and loses lock of the carrier tracking loop.

Once the loss of lock is detected, the mobile device 700 uses the displacement sensor 750 to track a change in position (as at 950) from the latest epoch prior to the loss of lock to the present epoch. The mobile device 700 also tracks an expected change in the received positioning signal (as at 952) and estimates the ambiguity increment resulting from the expected change (as at 954). The estimate of the ambiguity increment is updated over a plurality of epochs, during which time the mobile device 700 advances several meters in the position sensing environment 100 before finally receiving a second set of positioning signals from the transmitting device 140. During the advancement of several meters through the position sensing environment 100, the mobile device 700 determines, based on the displacement data, that the mobile device 700 has gotten ninety centimeters closer to the transmitting device 140. Based on the conclusion that the mobile device 700 has gotten ninety centimeters closer to the transmitting device 140, the mobile device 700 can determine that the carrier wave would have four fewer full cycles, resulting in an ambiguity increment ΔM of −4. Rather than resolving a second integer ambiguity $M_2$ 'from scratch' using conventional techniques, the mobile device 700 may resolve the second integer ambiguity by simply adding the ΔM of −4 to the first integer ambiguity of $M_1$=231,061, resulting in $M_2$=231,057.

Figure 10:
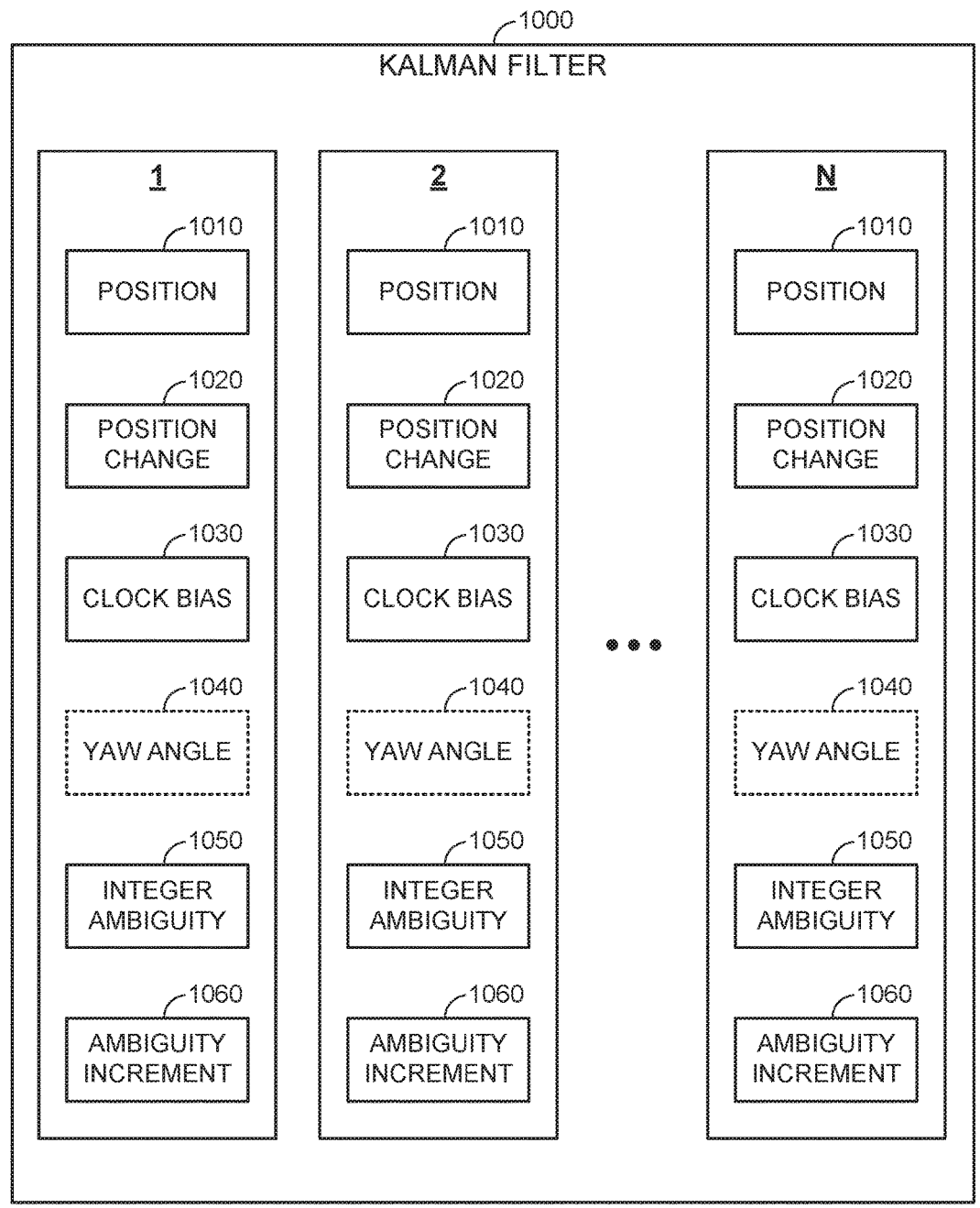
FIG. 10 generally illustrates a Kalman filter configured to implement the methods of FIG. 8 and/or FIG. 9 in accordance with aspects of the disclosure.

FIG. 10 generally illustrates a Kalman filter 1000 configured to implement the methods of FIG. 8 and/or FIG. 9 in accordance with aspects of the disclosure. The Kalman filter 1000 may be included in the mobile device 700 depicted in FIG. 7. It will be understood that in accordance with aspects of the disclosure, the Kalman filter 1000 may be implemented using the processor 710 and/or memory 720, the positioning signal receiver 730, and/or any other suitable component of the mobile device 700.

Generally, Kalman filters may include one or more state variables. Each state variable of the one or more state variables may be associated with a corresponding mean (which may be denoted μ) and a corresponding variance (which may be denoted σ). In some cases, two state variables in a Kalman filter may have a covariance (which may be denoted Σ). The Kalman filter may be a recursive filter that proceeds in a sequence of states denoted k, k+1, k+2, etc. In order to proceed from a first state [k] to a second state [k+1], the Kalman filter may proceed through a prediction stage and an update stage.

As an illustration, consider a pair of state variables denoted x and y, the state variables x and y having a covariance of $\Sigma_{xy}$ with respect to one another. In the prediction stage, predictions of the present states of the variables x and y (denoted $x_p[k]$ and $y_p[k]$, respectively) may be generated based on the covariance $\Sigma_{xy}$ and the previous states of the variable x and y (denoted x[k−1] and y[k−1], respectively). The predictions of the present states of the variables $x_p[k]$ and $y_p[k]$ may each be associated with a distribution of potential values, defined by a mean $\mu_p$ and a variance $\sigma_p$.

In the update stage, the Kalman filter may be provided with readings, for example, sensor readings, associated with the present states of the state variables x and y (denoted $x_r[k]$ and $y_r[k]$, respectively). Each reading may be associated with a distribution of potential values, defined by a mean $\mu_r$ (corresponding to, for example, a data point provided by the sensor) and a variance $\sigma_r$ (associated with a known or estimated inaccuracy of the sensor). In the update stage, the Kalman filter may use the predictions of the present states of the variables x and y ($x_p[k]$ and $y_p[k]$) to filter the readings of the present states of the variables x and y ($x_r[k]$ and $y_r[k]$). The filtering may be performed by multiplying the distribution of potential values associated with the prediction stage by the distribution of potential values associated with the update stage. The result of the multiplication may serve as a Kalman-filtered estimate of the present values of the state variables x and y (x[k] and y[k]) and may be provided as an output of the Kalman filter.

Because the Kalman filter is a recursive filer, the Kalman-filtered estimates x[k] and y[k] may also be used as inputs for estimates relating to a successive state [k+1]. Accordingly, the Kalman-filtered estimates x[k] and y[k] may be used to generate successive predictions $x_p[k+1]$ and $y_p[k+1]$, which may be used to filter successive readings $x_r[k+1]$ and $y_r[k+1]$, which become inputs to another successive state [k+2], etc.

Returning to FIG. 10, the Kalman filter 1000, in accordance with aspects of the disclosure, may include one or more sets of state variables. Each set of state variables may be associated with a different transmitting device. For example, a first set of state variables may be associated with the transmitting device 120 depicted in FIG. 1, a second set of state variables may be associated with the transmitting device 130 depicted in FIG. 1, etc. FIG. 10 depicts N sets of state variables, labeled "1", "2" . . . "N", however, it will be understood that the Kalman filter 1000 may include any number of sets of state variables in accordance with aspects of the disclosure.

Each set of state variables may include a position state variable 1010, a position change state variable 1020, a clock bias variable 1030, an optional yaw angle state variable 1040, an integer ambiguity state variable 1050, and an ambiguity increment state variable 1060.

The position state variable 1010 may indicate a position of the mobile device 700. The position state variable 1010 may be updated during an update stage of the Kalman filter 1000 based on readings provided by the displacement sensor 750.

The position change state variable 1020 may indicate a position change of the mobile device 700 and may be determined based on one or more previous states of the position state variable 1010. The position state variable 1010 and the position change state variable 1020 may be related via a position-to-position-change covariance matrix (not shown). The position-to-position-change covariance matrix may facilitate prediction of the position state variable 1010 during a prediction stage of the Kalman filter 1000.

The clock bias variable 1030 may indicate a bias and/or drift of a receiver clock associated with the positioning signal receiver 730. The position state variable 1010 and position change state variable 1020 may be related via a position-to-clock-bias covariance matrix (not shown). The position-to-clock-bias covariance matrix may facilitate prediction of the position state variable 1010 during a prediction stage of the Kalman filter 1000.

The optional yaw angle state variable 1040 may indicate a yaw angle of the mobile device 700 with respect to the transmitting device. The yaw angle state variable 1040 may be included to augment the displacement sensor 750 in some implementations. For example, if the displacement sensor 750 is a visual-inertial odometry (VIO) sensor, the yaw angle state variable 1040 may facilitate accommodation of VIO sensor drift.

The integer ambiguity state variable 1050 may indicate an integer ambiguity associated with the transmitting device. The integer ambiguity state variable 1050 may be resolved and then fixed (i.e., held constant) if a carrier tracking loop is locked (for example, as during the first carrier-phase range sensing period 671 depicted in FIG. 6). However, as noted above, an integer ambiguity may vary once a loss of lock is detected. Accordingly, the integer ambiguity state variable 1050 may be updated after a new carrier tracking loop is locked and a new integer ambiguity is resolved. As noted above, the resolution of the new integer ambiguity may be performed, in accordance with aspects of the disclosure, based on an ambiguity increment (for example, as during the second carrier-phase range sensing period 681 depicted in FIG. 6).

The ambiguity increment may be tracked using the ambiguity increment state variable 1060. As noted above, the ambiguity increment may be fixed for as long as a carrier tracking loop is locked, but may vary once a loss of lock is detected. Accordingly, the Kalman filter 1000 may use the ambiguity increment state variable 1060 to track an ambiguity increment, after a loss of lock is detected, until a new set of position signals is received (for example, during the ambiguity increment estimation period 680 depicted in FIG.

6). Once the new set of position signals is received, the ambiguity increment state variable 1060 may be used to rapidly update the integer ambiguity state variable 1050.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. An apparatus for use in position sensing, the apparatus comprising:
   a displacement sensor configured to generate spatial-based displacement data;
   a positioning signal receiver configured to:
      receive a first set of positioning signals from a transmitting device and estimate first range measurements to the transmitting device based on the first set of positioning signals, the first range measurements including a first set of carrier-phase measurements;
      receive a second set of positioning signals from the transmitting device and estimate second range measurements to the transmitting device based on the second set of positioning signals, the second range measurements including a second set of carrier-phase measurements;
   memory; and
   a processor coupled to the displacement sensor, the positioning signal receiver, and the memory, wherein the processor and the memory are configured to:
      detect a loss of lock of a first carrier tracking loop associated with the first set of carrier-phase measurements, wherein the first carrier tracking loop is associated with a first integer ambiguity;
      estimate, based on the spatial-based displacement data, an ambiguity increment to the first integer ambiguity subsequent to the detected loss of lock; and
      resolve a second integer ambiguity associated with the second set of positioning signals based on the first integer ambiguity and the estimated ambiguity increment.

2. The apparatus of claim 1, wherein the processor and the memory are further configured to:
   sense a first position of the apparatus based on the first set of carrier-phase measurements and the first integer ambiguity; and sense a second position of the apparatus based on the second set of carrier-phase measurements and the second integer ambiguity.

3. The apparatus of claim 1, wherein the spatial-based displacement data indicates a relative change in a position of the apparatus with respect to time.

4. The apparatus of claim 1, wherein the spatial-based displacement sensor comprises:
a visual-inertial odometry sensor;
one or more cameras;
one or more LIDAR sensors;
one or more accelerometers;
one or more gyroscopes;
one or more compasses; or
any combination thereof.

5. The apparatus of claim 1, wherein the processor and the memory are further configured to:
track the first integer ambiguity with a Kalman filter, wherein the first integer ambiguity is tracked by the Kalman filter as an integer ambiguity state variable associated with the transmitting device; and
track the ambiguity increment with the Kalman filter, wherein the ambiguity increment is tracked by the Kalman filter as an ambiguity increment state variable associated with the transmitting device.

6. The apparatus of claim 1, wherein the positioning signal receiver is further configured to:
receive the first set of positioning signals during a first period of time; and
receive the second set of positioning signals during a second period of time subsequent to the first period of time.

7. The apparatus of claim 6, wherein the processor and the memory are further configured to:
lock the first carrier tracking loop during the first period of time based on the first set of positioning signals; and
resolve the first integer ambiguity.

8. The apparatus of claim 6, wherein the processor and the memory are further configured to:
estimate the ambiguity increment during a period of time subsequent to the detected loss of lock, the period of time subsequent to the detected loss of lock being between the first period of time and the second period of time.

9. The apparatus of claim 6, wherein the processor and the memory are further configured to lock a second carrier tracking loop during the second period of time, wherein the second integer ambiguity is fixed after the second carrier tracking loop is locked.

10. The apparatus of claim 1, wherein the ambiguity increment is estimated by solving an integer least-squares problem associated with the spatial-based displacement data.

11. A method for use in position sensing, the method comprising:
generating spatial-based displacement data;
receiving a first set of positioning signals from a transmitting device and estimating first range measurements to the transmitting device based on the first set of positioning signals, the first range measurements including a first set of carrier-phase measurements;
receiving a second set of positioning signals from the transmitting device and estimating second range measurements to the transmitting device based on the second set of positioning signals, the second range measurements including a second set of carrier-phase measurements;
detecting a loss of lock of a first carrier tracking loop associated with the first set of carrier-phase measurements, wherein the first carrier tracking loop is associated with a first integer ambiguity;
estimating, based on the spatial-based displacement data, an ambiguity increment to the first integer ambiguity subsequent to the detected loss of lock; and
resolving a second integer ambiguity associated with the second set of positioning signals based on the first integer ambiguity and the estimated ambiguity increment.

12. The method of claim 11, further comprising:
sensing a first position of an apparatus based on the first set of carrier-phase measurements and the first integer ambiguity; and
sensing a second position of the apparatus based on the second set of carrier-phase measurements and the second integer ambiguity.

13. The method of claim 11, wherein the spatial-based displacement data indicates a relative change in a position of an apparatus with respect to time.

14. The method of claim 11, wherein to generate the spatial-based displacement data, the method uses a displacement sensor comprising:
a visual-inertial odometry sensor;
one or more cameras;
one or more LIDAR sensors;
one or more accelerometers;
one or more gyroscopes;
one or more compasses; or
any combination thereof.

15. The method of claim 11, further comprising:
tracking the first integer ambiguity with a Kalman filter, wherein the first integer ambiguity is tracked by the Kalman filter as an integer ambiguity state variable associated with the transmitting device; and
tracking the ambiguity increment to the Kalman filter, wherein the ambiguity increment is tracked by the Kalman filter as an ambiguity increment state variable associated with the transmitting device.

16. The method of claim 11, further comprising:
receiving the first set of positioning signals during a first period of time; and
receiving the second set of positioning signals during a second period of time subsequent to the first period of time.

17. The method of claim 16, further comprising:
locking the first carrier tracking loop during the first period of time based on the first set of positioning signals; and
resolving the first integer ambiguity.

18. The method of claim 16, further comprising:
estimating the ambiguity increment during a period of time subsequent to the detected loss of lock, the period of time subsequent to the detected loss of lock being between the first period of time and the second period of time.

19. The method of claim 16, further comprising locking a second carrier tracking loop during the second period of time, wherein the second integer ambiguity is fixed after the second carrier tracking loop is locked.

20. The method of claim 11, wherein estimating the ambiguity increment comprises solving an integer least-squares problem associated with the spatial-based displacement data.

21. An apparatus for use in position sensing, the apparatus comprising:

means for generating spatial-based displacement data;
means for receiving a first set of positioning signals from a transmitting device and estimating first range measurements to the transmitting device based on the first set of positioning signals, the first range measurements including a first set of carrier-phase measurements;
means for receiving a second set of positioning signals from the transmitting device and estimating second range measurements to the transmitting device based on the second set of positioning signals, the second range measurements including a second set of carrier-phase measurements;
means for detecting a loss of lock of a first carrier tracking loop associated with the first set of carrier-phase measurements, wherein the first carrier tracking loop is associated with a first integer ambiguity;
means for estimating, based on the spatial-based displacement data, an ambiguity increment to the first integer ambiguity subsequent to the detected loss of lock; and
means for resolving a second integer ambiguity associated with the second set of positioning signals based on the first integer ambiguity and the estimated ambiguity increment.

22. The apparatus of claim 21, further comprising:
means for sensing a first position of the apparatus based on the first set of carrier-phase measurements and the first integer ambiguity; and
means for sensing a second position of the apparatus based on the second set of carrier-phase measurements and the second integer ambiguity.

23. The apparatus of claim 21, wherein the means for generating spatial-based displacement data comprises:
a visual-inertial odometry sensor;
one or more cameras;
one or more LIDAR sensors;
one or more accelerometers;
one or more gyroscopes;
one or more compasses; or
any combination thereof.

24. The apparatus of claim 21, wherein the means for resolving the second integer ambiguity further comprises:
means for tracking the first integer ambiguity with a Kalman filter, wherein the first integer ambiguity is tracked by the Kalman filter as an integer ambiguity state variable associated with the transmitting device; and
means for tracking the ambiguity increment to the Kalman filter, wherein the ambiguity increment is tracked by the Kalman filter as an ambiguity increment state variable associated with the transmitting device.

25. The apparatus of claim 21, wherein the means for estimating the ambiguity increment further comprises means for solving an integer least-squares problem associated with the spatial-based displacement data.

26. A non-transitory computer-readable medium including code, which, when executed by a processor, causes the processor to perform operations, the non-transitory computer-readable medium comprising:
code for generating spatial-based displacement data;
code for receiving a first set of positioning signals from a transmitting device and estimating first range measurements to the transmitting device based on the first set of positioning signals, the first range measurements including a first set of carrier-phase measurements;
code for receiving a second set of positioning signals from the transmitting device and estimating second range measurements to the transmitting device based on the second set of positioning signals, the second range measurements including a second set of carrier-phase measurements;
code for detecting a loss of lock of a first carrier tracking loop associated with the first set of carrier-phase measurements, wherein the first carrier tracking loop is associated with a first integer ambiguity;
code for estimating, based on the spatial-based displacement data, an ambiguity increment to the first integer ambiguity subsequent to the detected loss of lock; and
code for resolving a second integer ambiguity associated with the second set of positioning signals based on the first integer ambiguity and the estimated ambiguity increment.

27. The non-transitory computer-readable medium of claim 26, further comprising:
code for sensing a first position of an apparatus based on the first set of carrier-phase measurements and the first integer ambiguity; and
code for sensing a second position of the apparatus based on the second set of carrier-phase measurements and the second integer ambiguity.

28. The non-transitory computer-readable medium of claim 26, wherein the code for generating spatial-based displacement data is associated with:
a visual-inertial odometry sensor;
one or more cameras;
one or more LIDAR sensors;
one or more accelerometers;
one or more gyroscopes;
one or more compasses; or
any combination thereof.

29. The non-transitory computer-readable medium of claim 26, wherein the code for resolving the second integer ambiguity further comprises:
code for tracking the first integer ambiguity with a Kalman filter, wherein the first integer ambiguity is tracked by the Kalman filter as an integer ambiguity state variable associated with the transmitting device; and
code for tracking the ambiguity increment to the Kalman filter, wherein the ambiguity increment is tracked by the Kalman filter as an ambiguity increment state variable associated with the transmitting device.

30. The non-transitory computer-readable medium of claim 26, wherein the code for estimating the ambiguity increment further comprises code for solving an integer least-squares problem associated with the spatial-based displacement data.

* * * * *